Patented Feb. 16, 1926.

1,573,603

UNITED STATES PATENT OFFICE.

BERTRAND B. GRUNWALD, OF ALAMEDA, CALIFORNIA.

PROCESS FOR MAKING HEAVY BASIC CARBONATE OF MAGNESIUM.

No Drawing.   Application filed June 30, 1924.   Serial No. 723,151.

*To all whom it may concern:*

Be it known that I, BERTRAND B. GRUNWALD, a citizen of Czechoslovakia, residing at Alameda, county of Alameda, and State of California, have invented new and useful Improvements in Processes for Making Heavy Basic Carbonate of Magnesium, of which the following is a specification.

This invention relates to a process for manufacturing heavy basic carbonate of magnesium.

It is well-known that carbonate of magnesia has been used for many years in the manufacture of means used for heat-insulating purposes.

It is one object of my invention to provide a process for manufacturing an improved heavy basic carbonate of magnesium, as hereinafter disclosed, which has various characteristics particularly adapting it for use for the purpose stated.

Another object of my invention is a continuation of the above process to form heat-insulating means, wherein the product of the above process is used as an ingredient.

My improved product has practically the same chemical composition as the light basic carbonate of magnesium but has distinctly different physical properties. It is considerably heavier and has greater cementing or binding qualities. Also, contrary to the light carbonate of magnesium known heretofore, it does not shrink in the drying. Due to the latter qualities this product is of great value as a binder in the manufacture of heat insulating materials made from diatomaceous earth, light carbonate of magnesium, etc. It also serves as an excellent filler in the molding of articles from paper pulp. This product is also used as raw material in the manufacture of an improved light basic carbonate of magnesia, as disclosed in my copending application Serial Number 723,152, filed June 30, 1924.

Following is a description of my process: I mix one part of ground calcined magnesite with ten to fifteen parts of water, and introduce carbon dioxide gas into this mixture. Due to the exothermic chemical reaction between the carbon dioxide ($CO_2$) and the magnesium oxide (MgO), the temperature of the mixture will rise gradually. The heat formed by the chemical reaction, of course, varies with the proportions of water used. The proportions of water used should, therefore, be such that at the termination of carbonization the temperature will be approximately 100° Fahrenheit. When a temperature of approximately 100° Fahrenheit is reached I stop the introduction of the carbon dioxide gas. I then allow the mixture to rest for a period of twenty minutes to several hours.

During this resting period the carbonate of magnesium keeps on expanding in volume. When the proper physical consistency is reached, it can be used immediately for any of the purposes mentioned above. In case it is desired to store this materal for any length of time, the mixture of carbonate of magnesium and water is cooled by adding more cold water.

The product resulting from the above described process is a heavy basic carbonate of magnesium, ready for use in forming heat-insulating means. In use, this product is mixed with asbestos or other suitable material and molded into the shape of the desired finished article. I then heat the molded product to a minimum temperature of 150° Fahrenheit to 250° Fahrenheit, previously to drying the same. The final resulting product is of the desired weight, of great strength and of the original molded shape, since the same does not shrink in drying.

I claim:

1. The process of manufacture of heavy basic carbonate of magnesium, which consists in introducing carbon dioxide gas into a mixture of calcined magnesite and water and utilizing the resulting heat of reaction in the formation of the desired physical properties of the resulting product.

2. The process of the manufacture of heavy carbonate of magnesium, which consists in introducing carbon dioxide gas into a mixture of calcined magnesite and water, utilizing the resulting heat of reaction in the formation of the desired physical properties of the resulting product, and thereafter permitting the product to stand for a period of time until the same has expanded to the proper physical consistency for use.

3. The process of the manufacture of heavy carbonate of magnesium, which consists in introducing carbon dioxide gas into a mixture of calcined magnesite and water, the proportion of the water being such that the temperature, due to the chemical reaction, shall reach approximately 100° Fahrenheit at the termination of carbonization, then allowing the mixture to rest for further expansion, and terminating the exspansion by the cooling of the mixture.

BERTRAND B. GRUNWALD.